United States Patent
Johnson et al.

(10) Patent No.: US 10,432,450 B2
(45) Date of Patent: Oct. 1, 2019

(54) DATA PLANE API IN A DISTRIBUTED COMPUTING NETWORK

(71) Applicant: Microsoft Technology Licensing, LLC., Redmond, WA (US)

(72) Inventors: James Ernest Johnson, Bellevue, WA (US); Guhan Suriyanarayanan, Redmond, WA (US); Luis Irun-Briz, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 509 days.

(21) Appl. No.: 15/199,762

(22) Filed: Jun. 30, 2016

(65) Prior Publication Data
US 2018/0006872 A1    Jan. 4, 2018

(51) Int. Cl.
*H04L 12/24* (2006.01)
*G06F 9/50* (2006.01)
*H04L 12/911* (2013.01)
*H04L 29/08* (2006.01)

(52) U.S. Cl.
CPC ........ *H04L 41/0266* (2013.01); *G06F 9/5077* (2013.01); *H04L 47/70* (2013.01); *H04L 67/10* (2013.01)

(58) Field of Classification Search
CPC ..... H04L 41/0266; H04L 47/70; H04L 67/10; G06F 9/5077
See application file for complete search history.

(56) References Cited

U.S. PATENT DOCUMENTS

| | | |
|---|---|---|
| 6,516,350 B1 | 2/2003 | Lumelsky et al. |
| 6,865,549 B1 | 3/2005 | Connor |
| 8,595,328 B2 | 11/2013 | Murakami et al. |
| 8,667,495 B1 | 3/2014 | Brandwine et al. |
| 8,719,804 B2 | 5/2014 | Jain |
| 9,009,312 B2 | 4/2015 | Archer et al. |
| 9,395,960 B2 * | 7/2016 | Monclus ................... G06F 8/41 |
| 9,935,894 B2 * | 4/2018 | Melander ............ H04L 41/5054 |
| 2008/0028391 A1 | 1/2008 | Nallipogu et al. |
| 2011/0019552 A1 * | 1/2011 | Karaoguz ............... H04L 45/00 370/236 |

(Continued)

OTHER PUBLICATIONS

Canonico, et al., "CloudTUI-FTS: A User-Friendly and Powerful Tool to Manage Cloud Computing Platforms", In Proceedings of the 9th EAI International Conference on Performance Evaluation Methodologies and Tools, Dec. 16, 2015, 4 Pages.

(Continued)

*Primary Examiner* — Philip J Chea
*Assistant Examiner* — Robert B McAdams
(74) *Attorney, Agent, or Firm* — Ray Quinney & Nebeker, P.C.; Thomas M. Hardman; Brandon K. Roper

(57) ABSTRACT

Embodiments are directed to a distributed computing system comprising a plurality of compute nodes for providing resources to users and a hierarchy of two or more layers of controllers coupling the compute nodes to a user interface via a control plane, wherein at least one compute node receives a local application program interface (API) call from an application running on the at least compute node, the local API call causing the at least one compute node to configure a local resource without requiring commands from the control plane.

19 Claims, 4 Drawing Sheets

(56) References Cited

U.S. PATENT DOCUMENTS

| | | | |
|---|---|---|---|
| 2011/0167473 A1* | 7/2011 | Evans | H04W 4/003 |
| | | | 726/1 |
| 2013/0205128 A1 | 8/2013 | Thompson et al. | |
| 2014/0181278 A1 | 6/2014 | Brandwine et al. | |
| 2014/0245319 A1 | 8/2014 | Fellows | |
| 2014/0304398 A1 | 10/2014 | Carlen et al. | |
| 2014/0365549 A1 | 12/2014 | Jenkins | |
| 2015/0067158 A1 | 3/2015 | Naseh et al. | |
| 2015/0169340 A1* | 6/2015 | Haddad | G06F 9/45533 |
| | | | 718/1 |
| 2017/0099188 A1* | 4/2017 | Chang | H04L 12/4633 |

OTHER PUBLICATIONS

Descher, et al., "Retaining Data Control to the Client in Infrastructure Clouds", In International Conference on Availability, Reliability and Security, Mar. 16, 2009, pp. 9-16.

Endo, et al., "A Survey on Open-source Cloud Computing Solutions", In Brazilian Symposium on Computer Networks and Distributed Systems, vol. 71, May 1, 2010, pp. 3-16.

Limbole, et al., "Infrastructure-as-a-Service and Comparative Study on Open-Source Cloud Infrastructure Solutions", In International Journal of Current Engineering and Technology, vol. 4, Issue 4, Aug. 1, 2014, pp. 2482-2488.

"International Search Report and Written Opinion Issued in PCT Application No. PCT/US2017/039349", dated Sep. 19, 2017, 10 Pages.

* cited by examiner

DATA PLANE API IN A DISTRIBUTED COMPUTING NETWORK

BACKGROUND

In a distributed computing services environment, such as cloud services network, users have limited exposure to the physical or logical hierarchy of the network. Typically, the user accesses an account via management portal that accepts the user's configuration and management commands. The distributed computing network then routes the commands as appropriate through the cloud service's stack to configure and manage the user's resources. As a result, whenever the user needs to perform any configuration or management actions, the commands must traverse the entire cloud service stack starting with the user interface portal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a control plane application program interface (API) that executes at lowest level of the cloud services stack. In particular, a control endpoint is implemented as granularly as possible using APIs. For example, the APIs may execute commands at the virtual machine (VM) level using an agent on a server node. This would allow for cycling a VM without having to reboot the entire server node. The control plane APIs may also allow nodes to be self-governing.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figures 1, 2:
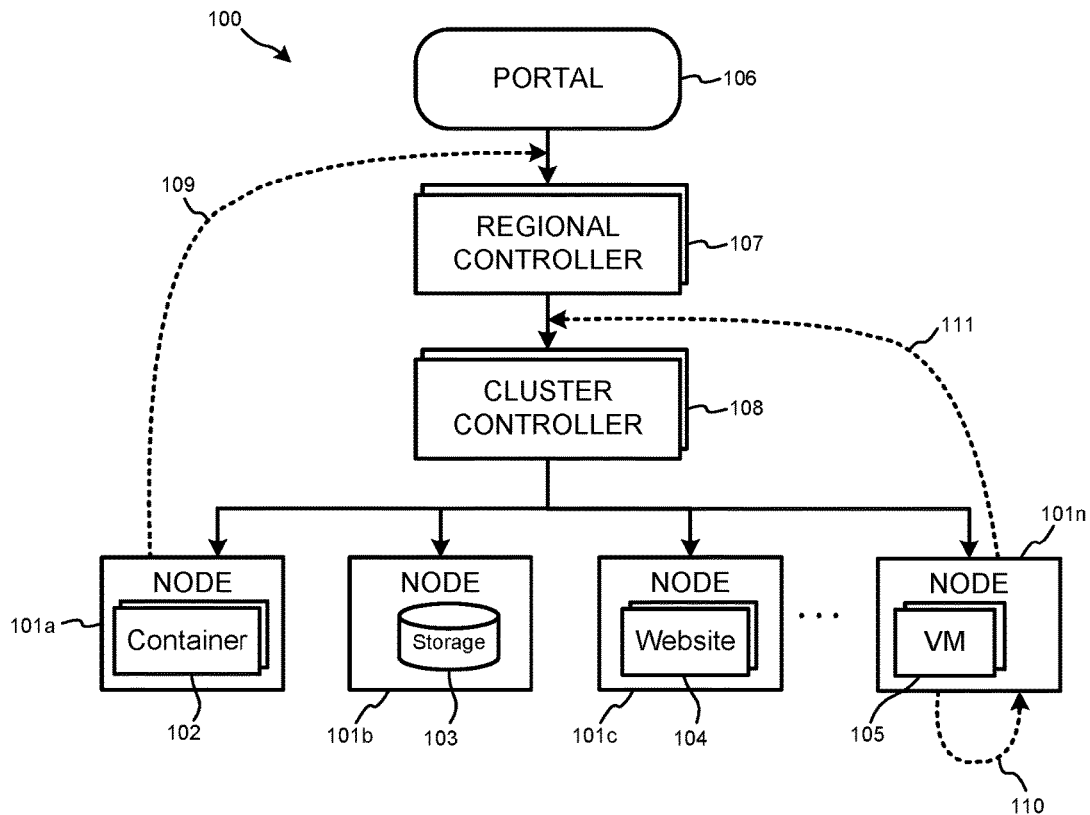
FIG. 1 is a high-level block diagram of a system having a plurality of distributed nodes.
FIG. 2 is a table illustrating where operations are primarily occurring during different phases of an application.

FIG. 1 is a high-level block diagram of a system 100 having a plurality of distributed nodes 101. The nodes 101 may represent, for example, servers in a single datacenter or in multiple datacenters that are part of a cloud services network. Nodes 101 may host container 102, which is a generic name for a class of technologies that can host application logic. For example, containers 102 may host storage 103, websites 104, virtual machines (VMs) 105, or other forms of packaging. Container 102 is a unit of computing that holds code (e.g., app specific code, VM code, OS code, etc.). Many containers 102 may run on a single server node simultaneously and the containers may be moved from node to node.

The resources on nodes 101 are used by datacenter tenants, such as cloud services network customers. In order to access the nodes 101, the users access a global portal 106, which may be a web-based user interface (UI), for example, that provides access for account setup, maintenance, and configuration. Portal 106 provides users with access to one or more regional controllers 107, which allow the users to create and configure resources. Regional controller 107 provides access to one or more cluster controllers 108 that control the nodes 101 that are assigned to a user.

To deploy containers 102, tenants select the size and number of hosts and then a container service manages the details of the deployment. The tenant may provide a model that specifies the degree to which local decisions are allowed in the container, such as scale-up, scale-down, local restart, allowed networks criteria, disk attach/detach criteria, container run size options, etc. For purposes of simplifying the description, the examples illustrated herein refer to containers 102 hosting VMs 105, but it will be understood that the data plane APIs may be used by a container 102 hosting any application logic. To deploy a VM 105, for example, the user logs in to portal 106 and requests that a particular VM model be deployed (e.g., a VM model may specify parameters such as "run no more than X copies of the VM, no less than Y copies of the VM, and start with N copies"). The portal forwards instructions to a regional controller 107, which identifies a cluster controller 108 controlling a group of nodes 101 that will host the VMs. The cluster controller 108 then instructs node 101n to load the VM 105. When providing instructions via portal 106, the commands must traverse the entire stack down to nodes 101.

The system of FIG. 1 may represent components in a virtual software-defined network that runs in multiple data centers. The control plane and the data plane of the network may be distributed across the data centers. The control plane carries command packets that control the deployment and management of applications and services on nodes 101. The data plane supports the execution of the application while it is running. FIG. 1 is a highly simplified illustration of a system. It will be understood by those of skill in the art that any number of levels in the control plane are allowed and that systems incorporating the invention are not limited to just a regional controller and cluster controller.

FIG. 2 is a table illustrating where operations are primarily occurring during different phases of an application. The control plane handles the bulk of the operations during application deployment and tear down. During runtime of the application, the data plane is handling virtually all of the operations. In existing systems, to control or manage operations on the nodes 101, such as rebooting VM 105, instructions must be initiated at the top of stack either through portal 106 or via instructions 109 to regional controller 107. In response to instructions 109, regional controller 107 generates instructions to cluster controller 108 via the control plane, which then forwards the instructions to node 101 on the control plane. The node 101 then executes the instructions by rebooting VM 105. Similarly, cluster-level operations, such as increasing or decreasing the number of active VMs 105 across nodes 101, must be initiated at the portal 106 or regional controller 107 level in existing systems.

In order for VM 105 to make API call 109, the VM would typically require a certificate or other authorization from the datacenter to perform such operations. That certificate is associated with a level of freedom that is usually not provided to a running system. By entering the normal control plane path, the application would have the capability to make a wide range of changes. This would make it would be more difficult to defend against out-of-control services running on the system, such as an uncontrolled autonomic repair engine that limits the number of VMs available for scale out of an application during runtime. Furthermore, requiring all VM control and management commands to initiate at the top of the control plane adds delay to their execution.

Embodiments disclosed herein allow node 101*n* or VM 105 to generate local API calls 110 at the data plane level to perform certain node-level operations. Alternatively, node 101*a* or VM 105 implement API call 111 to cluster controller 108 to perform certain cluster-level operations. Use of these APIs 110 avoids involvement of the control plane in operations that do not impact services outside the local node or cluster. In existing systems, a request for a configuration change enters the top of the control plane stack, such as instructions for an initial number of VMs (e.g., "run N copies of a target VM"), and those instructions are passed down the control plane to cause the new VMs run on a particular group of nodes. The APIs disclosed herein differ from normal control plane inputs by specifying allowable limits in addition to the initial targets. The data plane APIs disclosed herein are not required to traverse the control plane. Instead, the data plane API calls are made locally and grant freedom for limited local decisions. For example, the data plane API calls allow certain actions within the parameters specified in the particular model defining the target resource. This allows the compute node to make decisions at the local level as to scale out or scale down of the VMs. The data plane API calls generate local operations, such as scale-up, scale-down, local restart, allowed networks criteria, disk attach/detach criteria, resizing container run size, etc., within those container model parameters.

The following examples illustrate the type of local management that can be provided to datacenter nodes without invoking the control plane.

Auto-cleaning of VM. This operation may be used to restart a VM that is running potentially damaging software so that the VM is known to not have any of the damaging software or state when it restarts. An application that needs to restart and clean a VM may invoke an auto-cleaning API at the node level. The application makes an API call directing the VM to restart and, if the VM has not restarted within a designated period (e.g., N minutes), then the API forces the VM to restart. By making these statements available at the node level, then tenants can manage their pool of VMs locally without invoking the control plane. Additionally, these calls do not have to be made at the top of the stack, which would require propagating the relevant instructions down the stack on the control plane.

Cleaning of a remote VM. This is a variant of the auto-cleaning API above. Using this API, a first VM or an instance of an application running on the first VM can force the clean restart of a second VM. For example, a local work queue manager on one VM can drive coordination with other VMs doing the work.

Limited scale-out. This API allows the tenant to start a new VM up to a pre-allocated limit. The pre-allocated limit may be defined, for example, in the tenant's account or in a deployment model that gives the tenant permission to perform limited operations at the node or cluster level.

Limited scale-down. This API allows the tenant to shut down VMs down to a pre-allocated limit.

Network attach/detach. This API allows the tenant to attach VMs to a particular network, such as the tenant's virtual network, during certain operations. This allows the user to access the network when needed and then detach when completed without having to invoke the control plane each time.

Disk attach/detach. This API allows the tenant to attach a data disk to a VM as needed and then detach the disk when it is no longer required.

Resizing. This API allows the tenant to modify the container run size within the limits defined by the container model.

The tenant may be able to invoke other operations directly from the data plane, such as hibernation and container reallocation.

These APIs do not require a change in topology of the datacenter. The operations are invoked at the appropriate level within the datacenter topology depending upon the API called. For example, the auto-clean operation may be invoked at the node level, and the scale-up/scale-down operations may be invoked at the cluster controller level.

The API calls are functional statements of the operation that is requested without requiring the tenant to have knowledge of the datacenter structure. Therefore, the tenant does not have to define how the operation should be carried out or which elements of the datacenter need to be involved in the operation. For example, a VM or an application running on the VM can simply request the auto-clean API to reboot the VM without having to identify a particular server in the datacenter. This allows the tenant to implement these operations even if the VM has moved or if the internal structure of the datacenter changes.

Figure 3:
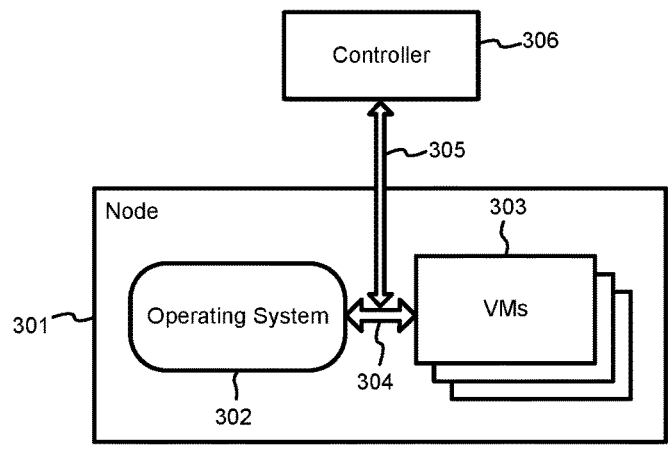
FIG. 3 is a block diagram of a node that is configured at a local level.

FIG. 3 is a block diagram of a node 301, which may be a particular server in a datacenter. Operating system 302 controls the operation of node 301. The node 301 hosts a plurality of VMs 303 that communicate with the operating system over internal bus or wire server 304. A VM 303 can make local requests to host 301 over wire server 304. An external bus or network 305 allows the node to communicate with controller 306 or other nodes (not shown).

Code running on a local VM 303 can call the local-management APIs such as those described herein. For example, code running on a particular VM 303 may call the auto-clean API to request that the node 301 reboot that VM. The host node 301 may then act locally to reboot the VM without issuing an external request or requiring instructions from the datacenter control plane.

Figure 4:
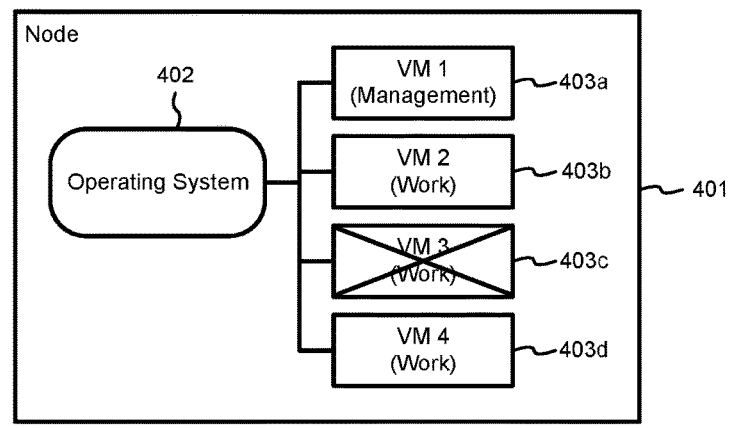
FIG. 4 illustrates a node with resources configured at a local level.

FIG. 4 illustrates a node 401 with operating system 402. Node 401 is hosting at least four VMs 403*a-d*. In the illustrated example, VM1 403*a* is managing jobs assigned to node 401. During normal operation VMs 403*b-d* work on jobs assigned by VM1 403*a*. If one of the VMs 403*b-d* stops responding to VM1 403*a* or is otherwise not operating properly, then VM1 403*a* can send an API call to host operating system 402 requesting that the failed VM be rebooted. For example, if VM3 403*c* stops responding to network packets from VM1 403*a* or otherwise is not progressing the assigned job, then the managing VM can request that VM3 403*c* be rebooted or otherwise cleaned up. If VM1 403*a* and VM3 403*c* are on the same host node 401, then that node 401 can then decide locally whether to reboot or otherwise modify VM3 403*c*.

In an alternative embodiment, VM1 and VM3 may be on different host nodes or servers, in which case the API call from VM1 may be routed one layer higher, such as to a cluster controller that oversees both host nodes. The API call from VM1 403*a* may be forwarded by the host node operating system or may be automatically routed to the higher level depending upon how the datacenter is configured to handle that type of API call. If the API call is routed to a higher level, then the cluster controller can then decide locally whether or not to instruct VM3's host node to reboot or clean up VM3. As described with respect to the host node 401, the cluster controller may also act locally to reboot VM3 without issuing an external request or requiring instructions from the datacenter control plane.

Figure 5:
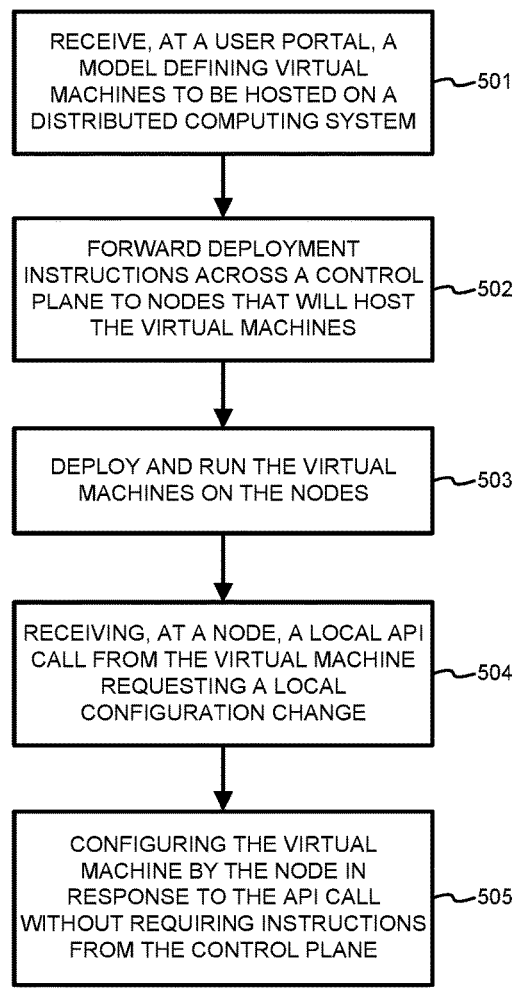
FIG. 5 is a flowchart illustrating a method for controlling resources in a distributed computing system according to an example embodiment.

FIG. 5 is a flowchart illustrating a method for controlling resources in a distributed computing system according to an example embodiment. The distributed computing system may comprise, for example, a plurality of compute nodes providing resources to users. The distributed computing system comprises a hierarchy of two or more layers of controllers coupling the compute nodes to a user interface via the control plane. In step 501, a distributed computing system receives a model defining VMs, or other container application logic, to be hosted. The model may specify, for example, the degree to which local decisions are allowed in the container, such as scale-up, scale-down, local restart, allowed networks criteria, disk attach/detach criteria, container run size options, etc. In step 502, the portal forwards VM deployment instructions across a control plane of the distributed computing system to one or more nodes or servers that will host the VMs. In step 503, the VMs are deployed and run on the nodes under control of a local controller, such as cluster controller.

In step 504, the node receives a local API call from the VM or from an application executing on the VM requesting a local configuration change. In step 505, the node configures the VM in response to the local API call without requiring commands from a control plane. In response to the API call, the node may clean or reboot the VM, clean or reboot another VM, start one or more new VM, shut down one or more VMs, attach the VM to a communication network or disk, detach the container to the communication network, etc.

Figure 6:
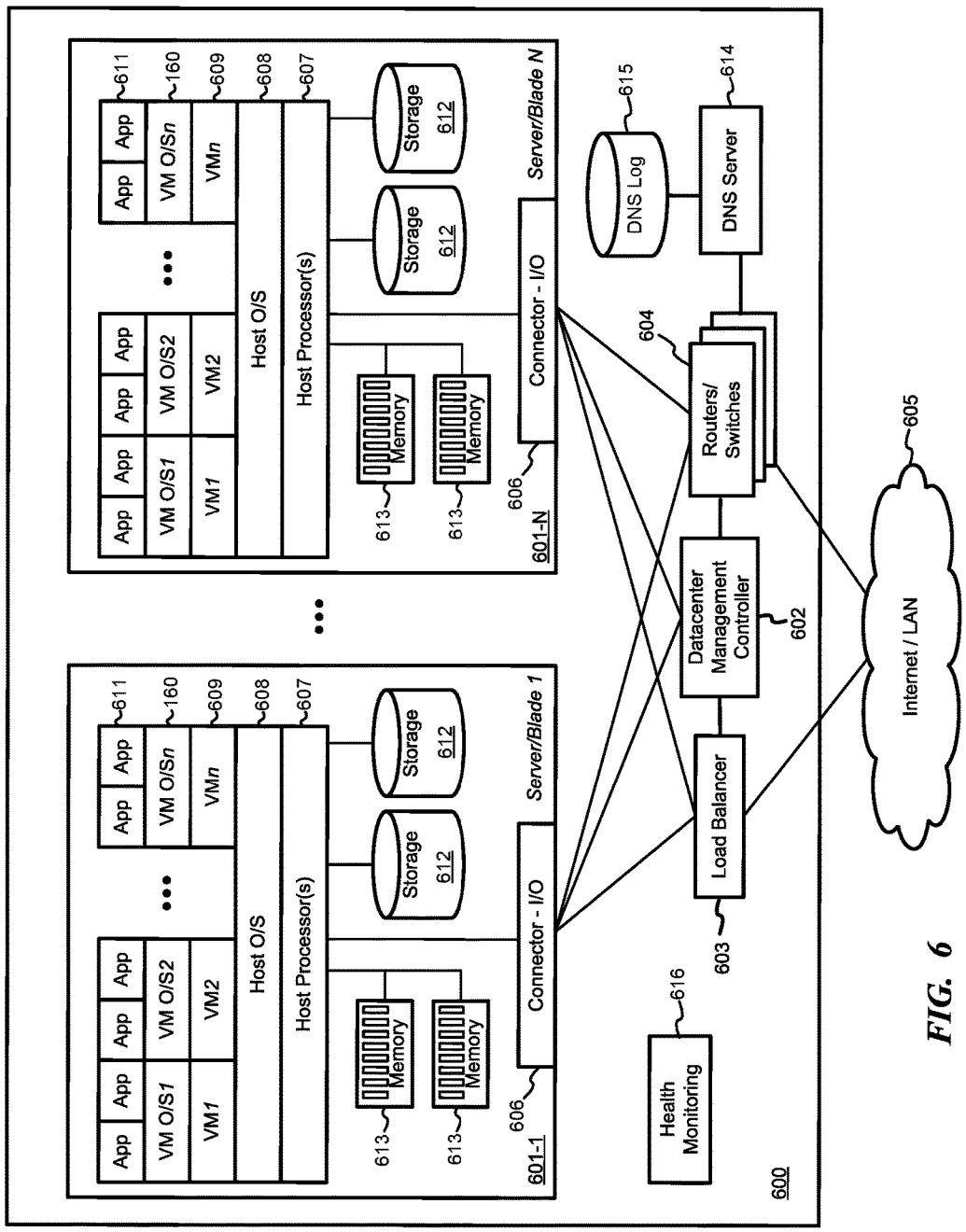
FIG. 6 is a high level block diagram of an example datacenter that provides cloud computing services or distributed computing services using data plane APIs as disclosed herein.

FIG. 6 is a high level block diagram of an example datacenter 600 that provides cloud computing services or distributed computing services using data plane APIs as disclosed herein. Datacenter 600 may incorporate the features disclosed in FIGS. 1-5. A plurality of servers 601 are managed by datacenter management controller 602. Load balancer 603 distributes requests and workloads over servers 601 to avoid a situation wherein a single server may become overwhelmed. Load balancer 603 maximizes available capacity and performance of the resources in datacenter 600. Routers/switches 604 support data traffic between servers 601 and between datacenter 600 and external resources and users (not shown) via an external network 605, which may be, for example, a local area network (LAN) or the Internet.

Servers 601 may be standalone computing devices and/or they may be configured as individual blades in a rack of one or more server devices. Servers 601 have an input/output (I/O) connector 606 that manages communication with other database entities. One or more host processors 607 on each server 601 run a host operating system (O/S) 608 that supports multiple virtual machines (VM) 609. Each VM 609 may run its own O/S so that each VM O/S 160 on a server is different, or the same, or a mix of both. The VM O/S's 160 may be, for example, different versions of the same O/S (e.g., different VMs running different current and legacy versions of the Windows® operating system). In addition, or alternatively, the VM O/S's 160 may be provided by different manufacturers (e.g., some VMs running the Windows® operating system, while others VMs are running the Linux® operating system). Each VM 609 may also run one or more applications (App) 611. Each server 601 also includes storage 612 (e.g., hard disk drives (HDD)) and memory 613 (e.g., RAM) that can be accessed and used by the host processors 607 and VMs 609 for storing software code, data, etc. In one embodiment, a VM 609 may employ the data plane APIs as disclosed herein.

Datacenter 600 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 600 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 609 on server 601-1 to run their applications 611. When demand for an application 611 increases, the datacenter 600 may activate additional VMs 609 on the same server 601-1 and/or on a new server 601-N as needed. These additional VMs 609 can be deactivated if demand for the application later drops.

Datacenter 600 may offer guaranteed availability, disaster recovery, and back-up services. For example, the datacenter may designate one VM 609 on server 601-1 as the primary location for the tenant's application and may activate a second VM 609 on the same or different server as a standby or back-up in case the first VM or server 601-1 fails. Database manager 602 automatically shifts incoming user requests from the primary VM to the back-up VM without requiring tenant intervention. Although datacenter 600 is illustrated as a single location, it will be understood that servers 601 may be distributed to multiple locations across the globe to provide additional redundancy and disaster recovery capabilities. Additionally, datacenter 600 may be an on-premises, private system that provides services to a single enterprise user or may be a publically accessible, distributed system that provides services to multiple, unrelated customers and tenants or may be a combination of both.

Domain Name System (DNS) server 614 resolves domain and host names into IP addresses for all roles, applications, and services in datacenter 600. DNS log 615 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 616 monitors the health of the physical systems, software, and environment in datacenter 600. Health monitoring 616 provides feedback to datacenter managers when problems are detected with servers, blades, processors, or applications in datacenter 600 or when network bandwidth or communications issues arise.

Access control service 617 determines whether users are allowed to access particular connections and services on cloud service 600. Directory and identify management service 618 authenticates user credentials for tenants on cloud service 600.

An example distributed computing system comprises a plurality of compute nodes for providing resources to users, and a hierarchy of two or more layers of controllers coupling the compute nodes to a user interface via a control plane, wherein at least one compute node receives a local API call from code executing on the at least compute node, the API call causing the at least one compute node to configure a local resource without requiring commands from the control plane.

In additional embodiments, the resources are containers specified by a model that defines limits to which local decisions are allowed.

In additional embodiments, the container model defines virtual machines, specific applications, or operating systems.

In additional embodiments, the local API call causes the compute node to auto-clean the container running the code.

In additional embodiments, the local API call causes the compute node to clean a container on the same compute node other than the container running the code.

In additional embodiments, the local API call causes the compute node to start one or more new containers.

In additional embodiments, the local API call causes the compute node to shut down one or more containers.

In additional embodiments, the local API call causes the compute node to attach the containers to a communication network.

In additional embodiments, the local API call causes the compute node to attach the containers to a disk.

In additional embodiments, the local API call causes the compute node to resize the run space available for the container.

In additional embodiments, the system further comprises a cluster controller coupled to two or more compute nodes, wherein the local API call from a first container on a first compute node causes a second container on a second compute node to be cleaned.

In additional embodiments, the system further comprises a cluster controller coupled to two or more compute nodes, wherein the local API call from a first container on a first compute node causes a second container on a second compute node to start.

An example method for controlling resources in a distributed computing system is implemented on a computer and comprises receiving, at a compute node in the distributed computing system, a local API call from an application running on the compute node, and configuring a local resource in response to the local API call without requiring commands from a control plane.

In other embodiments of the method, the distributed computing system comprises a plurality of compute nodes for providing resources to users, and the distributed computing system comprises a hierarchy of two or more layers of controllers coupling the compute nodes to a user interface via the control plane.

In other embodiments of the method, the resources comprise containers, and the application comprises code executing on a container.

Other embodiments of the method further comprise, in response to the API call, configuring a local resource without requiring commands from the control plane.

Other embodiments of the method further comprise, in response to the API call, auto-cleaning the container.

Other embodiments of the method further comprise, in response to the local API call, starting one or more new containers or shutting down one or more containers.

Other embodiments of the method further comprise, in response to the local API call, attaching the virtual machine to a communication network or detaching the container to the communication network.

Other embodiments of the method further comprise, in response to the local API call, attaching the container to a disk or detaching the container from the disk.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed computing system, comprising:
   a plurality of compute nodes for providing resources to users; and
   a hierarchy of two or more layers of controllers coupling the plurality of compute nodes to a user interface via a control plane;
   wherein at least one compute node receives a local application program interface (API) call from code executing on the at least one compute node, the local API call causing the at least one compute node to configure a local resource without requiring commands from the control plane, the local API call being within parameters specified in a model, the parameters defining limits as to which local decisions are allowed.

2. The system of claim 1, wherein the local resource includes one or more containers specified by the model.

3. The system of claim 2, wherein the model defines virtual machines, specific applications, or operating systems.

4. The system of claim 2, wherein the local API call causes the at least one compute node to auto-clean a container running the code.

5. The system of claim 2, wherein the local API call causes the compute node to clean a second container on the compute node other than a container running the code.

6. The system of claim 2, wherein the local API call causes the compute node to start one or more new containers.

7. The system of claim 2, wherein the local API call causes the compute node to shut down one or more containers.

8. The system of claim 2, wherein the local API call causes the compute node to attach the containers to a communication network.

9. The system of claim 2, wherein the local API call causes the compute node to attach the containers to a disk.

10. The system of claim 2, wherein the local API call causes the compute node to resize a run space available for the container.

11. The system of claim 2, further comprising:
    a cluster controller coupled to two or more compute nodes; and
    wherein the local API call from a first container on a first compute node causes a second container on a second compute node to be cleaned.

12. The system of claim 2, further comprising:
    a cluster controller coupled to two or more compute nodes; and wherein the local API call from a first container on a first compute node causes a second container on a second compute node to start.

13. A computer-implemented method for controlling resources in a distributed computing system, comprising:

receiving, at a compute node in the distributed computing system, a local application program interface (API) call from an application running on the compute node; and configuring a local resource in response to the local API call without requiring commands from a control plane, the local API call being within parameters specified in a model, the parameters defining limits as to which local decisions are allowed.

14. The method of claim 13, wherein the distributed computing system comprises a plurality of compute nodes for providing resources to users, and the distributed computing system comprises a hierarchy of two or more layers of controllers coupling the plurality of compute nodes to a user interface via the control plane.

15. The method of claim 13, wherein the resources comprise containers, and the application comprises code executing on a container.

16. The method of claim 15, further comprising:
in response to the API call, auto-cleaning the container.

17. The method of claim 15, further comprising:
in response to the local API call, starting one or more new containers or shutting down one or more containers.

18. The method of claim 14, further comprising:
in response to the local API call, attaching a virtual machine to a communication network or detaching the container to the communication network.

19. The method of claim 14, further comprising:
in response to the local API call, attaching the container to a disk or detaching the container from the disk.

* * * * *